US007527851B2

(12) United States Patent
Schuh et al.

(10) Patent No.: US 7,527,851 B2
(45) Date of Patent: May 5, 2009

(54) TISSUE PRODUCT WITH MIXED INCLINATION EMBOSSES

(75) Inventors: Brian J. Schuh, Appleton, WI (US); John H. Dwiggins, Neenah, WI (US); T. Philips Oriaran, Appleton, WI (US); Galyn A. Schulz, Greenville, WI (US)

(73) Assignee: Georgia-Pacific Consumer Products LLP, Atlanta, GA (US)

( * ) Notice: Subject to any disclaimer, the term of this patent is extended or adjusted under 35 U.S.C. 154(b) by 224 days.

(21) Appl. No.: 11/471,225

(22) Filed: Jun. 20, 2006

(65) Prior Publication Data

US 2006/0286885 A1 Dec. 21, 2006

Related U.S. Application Data

(60) Provisional application No. 60/692,797, filed on Jun. 21, 2005.

(51) Int. Cl.
*B32B 3/00* (2006.01)

(52) U.S. Cl. ...................... 428/156; 428/171; 428/172; 428/187; 428/192; 428/218; 442/327; 442/409

(58) Field of Classification Search ................. 428/156, 428/171, 172, 187, 192, 218; 442/327, 409
See application file for complete search history.

(56) References Cited

U.S. PATENT DOCUMENTS

| | | | |
|---|---|---|---|
| 361,844 | A | 4/1887 | Taylor |
| 496,964 | A | 5/1893 | Wheeler |
| 497,421 | A | 5/1893 | Wheeler |
| D40,254 | S | 9/1909 | Zschaemisch |
| D63,343 | S | 11/1923 | Vanderqaw et al. |
| D64,690 | S | 5/1924 | Schwarz |
| D77,398 | S | 1/1929 | De Lancy |
| 2,121,013 | A | 6/1938 | Brown |
| D117,018 | S | 10/1939 | Turpan |
| D154,696 | S | 8/1949 | Mitschke |
| D167,528 | S | 8/1952 | Odzer |
| D179,699 | S | 2/1957 | Sadinoff |
| D184,493 | S | 2/1959 | Scheiding |
| D184,878 | S | 4/1959 | Korkovius |
| 2,954,838 | A | 10/1960 | Nuorivaara |
| 3,240,656 | A | 3/1966 | Faircloth |
| D213,661 | S | 3/1969 | Hicks |
| D231,019 | S | 3/1974 | Gilling et al. |
| D231,021 | S | 3/1974 | Gilling et al. |
| D239,137 | S | 3/1976 | Appleman |
| 4,307,141 | A | 12/1981 | Walbrun |
| 4,320,162 | A | 3/1982 | Swchulz |

(Continued)

FOREIGN PATENT DOCUMENTS

WO 2007/002171 A1 1/2007

OTHER PUBLICATIONS

International Search Report for International Application No. PCT/US06/24107.

*Primary Examiner*—Norca L Torres-Velazquez

(57) ABSTRACT

An emboss pattern, tissue product and method of manufacturing tissue product having improved bulk and softness with minimal roll ridging. The pattern combines a plurality of aligned signature bosses with a grouping of signature bosses offset from the machine direction in a clockwise manner and another grouping of signature bosses being offset in a counter-clockwise manner.

9 Claims, 17 Drawing Sheets

U.S. PATENT DOCUMENTS

| | | | | | |
|---|---|---|---|---|---|
| 4,339,088 | A | | 7/1982 | Niedermeyer | |
| 4,483,728 | A | | 11/1984 | Bauernfeind | |
| D288,150 | S | | 2/1987 | Schulz et al. | |
| 4,659,608 | A | | 4/1987 | Schulz | |
| 4,671,983 | A | | 6/1987 | Burt | |
| 4,759,967 | A | | 7/1988 | Bauernfeind | |
| D298,588 | S | | 11/1988 | Peddada | |
| 4,803,032 | A | | 2/1989 | Schulz | |
| 4,927,588 | A | | 5/1990 | Schulz | |
| D319,349 | S | | 8/1991 | Schulz et al. | |
| 5,158,819 | A | | 10/1992 | Goodman, Jr. et al. | |
| 5,300,347 | A | | 4/1994 | Underhill et al. | |
| 5,436,057 | A | | 7/1995 | Schulz | |
| D362,121 | S | * | 9/1995 | Nugent et al. | D5/53 |
| 5,573,830 | A | | 11/1996 | Schulz | |
| 5,597,639 | A | | 1/1997 | Schulz | |
| 5,620,776 | A | | 4/1997 | Schulz | |
| 5,874,156 | A | | 2/1999 | Schulz | |
| D408,152 | S | * | 4/1999 | Wilhelm et al. | D5/53 |
| 5,904,812 | A | | 5/1999 | Salman et al. | |
| 6,077,390 | A | | 6/2000 | Salman et al. | |
| 6,344,111 | B1 | * | 2/2002 | Wilhelm | 162/117 |
| 6,413,614 | B1 | | 7/2002 | Giesler, Sr. et al. | |
| 6,440,268 | B1 | | 8/2002 | Baggot et al. | |
| 6,558,511 | B2 | | 5/2003 | Dwiggins et al. | |
| D488,931 | S | * | 4/2004 | Dwiggins | D5/25 |
| 6,733,608 | B1 | | 5/2004 | Baggot et al. | |
| 6,827,819 | B2 | | 12/2004 | Dwiggins et al. | |
| 6,896,767 | B2 | | 5/2005 | Wilhelm | |
| 6,896,768 | B2 | | 5/2005 | Dwiggins et al. | |
| D519,739 | S | * | 5/2006 | Schuh et al. | D5/37 |
| 2001/0008683 | A1 | | 7/2001 | Takai et al. | |

* cited by examiner

Emboss Area A Topside of Tissue

Emboss Area A Backside of Tissue

Emboss Area B Topside of Tissue

Emboss Area B Backside of Tissue

FIG. 26

Overall HUT Summary

1. Objectives of 74 to 75 OAR rating acheived

2 . New emboss patterns are percieved as more attractive

3 . The 396 ct. Club 6 product is the highest scoring product and exceeds current product for OAR and all significant attributes Comparison of Current and New Products' HUT results Using the Same base sheet

| Product | OAR | Absorbency | Strength | Softness | Thickness | Attractiveness | Roll Life |
|---|---|---|---|---|---|---|---|
| Current Product 425 ct. | 70 | 71 | 70 | 73 | 60 | 67 | 63 |
| 425 ct. Club 6 | 75 | 75 | 72 | 78 | 64 | 74 | 70 |
| 425 ct. Club 4 | 73 | 76 | 71 | 78 | 62 | 72 | 69 |

Highlighted cells are scores significantly higher than the current product

FIG. 27

| Attribute | N40C Control 55DD | P1887 Club 1 55DD | P1891 Club 2 55DD | P1977.1-A Club 4 55DD | P1979.1-A Club 6 55DD | P1979.1-B Club 6 55DD | P1977.1-D Club 4 40D low friction rubber | P1979.1-B Club 6 38D |
|---|---|---|---|---|---|---|---|---|
| Sheet Count | 428 | 428 | 428 | 428 | 428 | 428 | 428 | 428 |
| Basis Weight (lbs/ream) | 18.7 | 19.8 | 19.6 | 19.9 | 19.9 | 18.7 | 18.9 | 18.8 |
| Caliper (mils/8sheets) | 72.5 | 69.7 | 69.4 | 70.1 | 73.2 | 65.6 | 66.9 | 70.0 |
| MD Dry Tensile (g/3") | 1022 | 1087 | 1077 | 972 | 975 | 990 | 1000 | 1038 |
| CD Dry Tensile (g/3") | 343 | 365 | 367 | 369 | 352 | 365 | 378 | 341 |
| Geometric Mean Tensile (g/3") | 592 | 629 | 628 | 599 | 585 | 601 | 615 | 595 |
| MD Stretch (%) | 15.9 | 17.4 | 15.5 | 15.2 | 14.7 | 15.4 | 14.6 | 15.9 |
| CD Stretch (%) | 8.7 | 8.5 | 9.4 | 8.3 | 8.9 | 8.1 | 8.4 | 9.0 |
| GM Break Modules (g/%) | 50.2 | 52.0 | 52.3 | 52.8 | 50.8 | 54.0 | 54.9 | 50.4 |
| Friction (GMMMD) | 0.548 | 0.524 | 0.544 | 0.455 | 0.590 | 0.646 | 0.514 | 0.677 |
| Roll Diameter (inches) | 4.65 | 4.66 | 4.66 | 4.69 | 4.70 | 4.67 | 4.7 | 4.61 |
| Roll Compression (%) | 13.9 | 12.9 | 14.8 | 16.2 | 14.6 | 22.8 | 17.90 | 15.6 |
| Sensory Softness | 18.74 | 18.46 | 18.28 | 18.5 | 18.56 | 18.7 | 18.9 | 18.8 |

TISSUE PRODUCT WITH MIXED INCLINATION EMBOSSES

RELATED APPLICATION

This application claims the benefit of U.S. Provisional Application No. 60/692,797, filed Jun. 21, 2005.

TECHNICAL FIELD

The invention generally relates to paper products and more particularly to embossed tissue products exhibiting a high perceived softness.

BACKGROUND OF THE INVENTION

Tissue products manufactured using wet press technology can be embossed subsequent to creping to improve bulk, appearance and perceived softness. It is known in the art to emboss sheets comprising multiple plies of tissue to increase the surface area of the sheets thereby enhancing their bulk and moisture holding capacity. Tissue products are usually marketed in rolls, containing a specified number of sheets per roll. Tissue embossed in conventional patterns of spot debossments, when packaged in roll form, exhibit a tendency to be non-uniform in appearance often due to uneven buildup of the bosses as the sheet is wound onto the roll, resulting in a ridging effect detracting from the appearance of the rolls.

SUMMARY OF THE INVENTION

A tissue product exhibiting improved tactile and visual characteristics is disclosed. The tissue product is defined by a plurality of signature boss groupings, each grouping including a plurality of similarly aligned signature bosses. Major axes of one of the groupings of signature bosses diverge in the clockwise direction from the machine direction of said web, and major axes of another of grouping of signature bosses diverge in the counter-clockwise direction from the machine direction of said web.

One advantage of the present invention is to provide an embossed tissue which avoids buildup and ridging problems while heightening the consumer's perception of softness. The pattern which is formed in the tissue of the present invention may be formed by debossing or embossing. When an emboss pattern is formed, the reverse side of the sheet retains a deboss pattern. The projections which are formed are referred to as bosses. When a deboss pattern is formed, the reverse side of the sheet retains an emboss pattern and the projections are still referred to as bosses. Thus, the methodologies may be interchanged while producing the same product. When the web or sheets are formed into a roll, the tissue is aligned so that the bosses are internal to the roll and the debossed side of the tissue is exposed.

The product according to the present invention may include signature bosses, macro bosses and micro bosses. Signature bosses may be made up of any embossing design. They are most often a design which may be related by consumer perception to the particular manufacturer of the tissue. Macro bosses and micro bosses may assume a variety of different configurations, for example stitch-like bosses and rounded dot-like bosses.

In one embodiment of the present invention, the boss pattern combines relatively shallow micro bosses with deeper defined macro bosses and signature bosses. Signature bosses may be formed of groupings of closed linear bosses. For example, a signature boss may be formed as groupings of closed linear bosses defining peripheral plateaus around a central region. Groupings of signature bosses are preferably linearly aligned. A pattern of mixed inclinations is selected so that some of the signature boss groupings are aligned in the machine direction, some are aligned with a clockwise offset relative to machine direction, and some of the signature boss groupings are aligned with a counterclockwise offset relative to machine direction. One effect of this mixed inclination arrangement is that the rolls possess very good roll structure and do not exhibit the ridging effect found with prior art embossed tissue patterns.

Signature bosses, macro bosses and micro bosses serve to greatly enhance the bulk of the tissue while also enhancing the distortion of the surface thereof. The signature bosses may be groupings of continuous linear embosses and embossed or debossed to significantly greater depth than the micro bosses. The signature bosses and macro bosses may be embossed or debossed to an equal height and have similarly defined boundaries. Groupings of signature bosses may exhibit the same overall pattern but may be scaled in size, e.g., the paper product may include two differently scaled signature bosses. The macro bosses can define continuous or stitchlike patterns embossed or debossed to greater depth than micro bosses. In addition, the signature bosses further enhance the puffy or filled appearance of the sheet both by creating the illusion of shading as well as by creating actual shading due to displacement of the sheet apparently caused by puckering of surrounding regions due to the heavy embossing or debossing given to the signature.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The present invention will be more fully understood and further advantages will become apparent when reference is made to the following detailed description of the invention and the accompanying drawings wherein like numerals represent like elements, and in which:

FIG. 26 includes results from a Home Use Test of tissue products.

FIG. 27 includes data from a comparative experiment of tissue products.

DETAILED DESCRIPTION

According to one embodiment of the present invention, enhanced perceived softness, controlled sidedness, good roll structure and good ply bonding are provided by a tissue substrate having embossed therein a pattern which is comprised of distinct elements, the first, an array of signature bosses, the second, an array of macro bosses and the third, a pattern of micro bosses. The macro bosses preferably comprise discontinuous elements that are embossed or debossed in the tissue substrate in a pattern of a meandering linear array. In the illustrated embodiments of the invention, cells defined by the macro bosses are generally in the shape of a tapered ellipse. In alternative embodiments of the invention, the cells defined by macro bosses may be differently configured.

The macro bosses further define generally linear sections aligned in a predetermined direction, which may be offset from the machine direction. The effect is a pattern having discontinuous lines and curves defining a plurality of generally interconnected cells. In one embodiment of the present invention, each cell contains only a signature boss (FIGS. 1-9), while in another embodiment the cells contain both a signature boss and a plurality of micro bosses in a fill pattern (FIGS. 10-18). In the present application, when describing the bosses "in front of" and "behind" refer to the depth of the boss pattern. A boss which is embossed to less depth is in front of a boss which is embossed to a greater depth.

Substrates for use in the present invention include toilet tissue. The paper substrates for forming the tissue are readily recognizable to the skilled artisan. In one example, the paper substrate may have a basis weight of from about 8.5 to about 15.5 pounds per 3000 square foot ream of tissue.

One embodiment of a boss pattern according to the invention is disclosed in FIGS. 1-9, wherein macro bosses define a plurality of nested cells each containing a signature boss. The macro boss pattern is defined by an array of dot-like bosses extending across the tissue field. In another embodiment of the invention as disclosed in FIG. 10-18, macro bosses define a plurality of cells containing micro bosses in a fill pattern surrounding the signature bosses. Micro bosses may define a fill pattern between the nested cells. In one embodiment of the present invention, the macro bosses are generally dot-shaped, and the micro bosses are generally elliptical in shape. The macro bosses can define a pattern of cells of varying shapes. Cell shapes which can be used in the present invention include a generally elliptical shaped cell. Other cell shapes are readily recognizable to the skilled artisan. In a preferred embodiment, the cells are nested and are generally elliptical in form with tapered ends.

Figure 1:
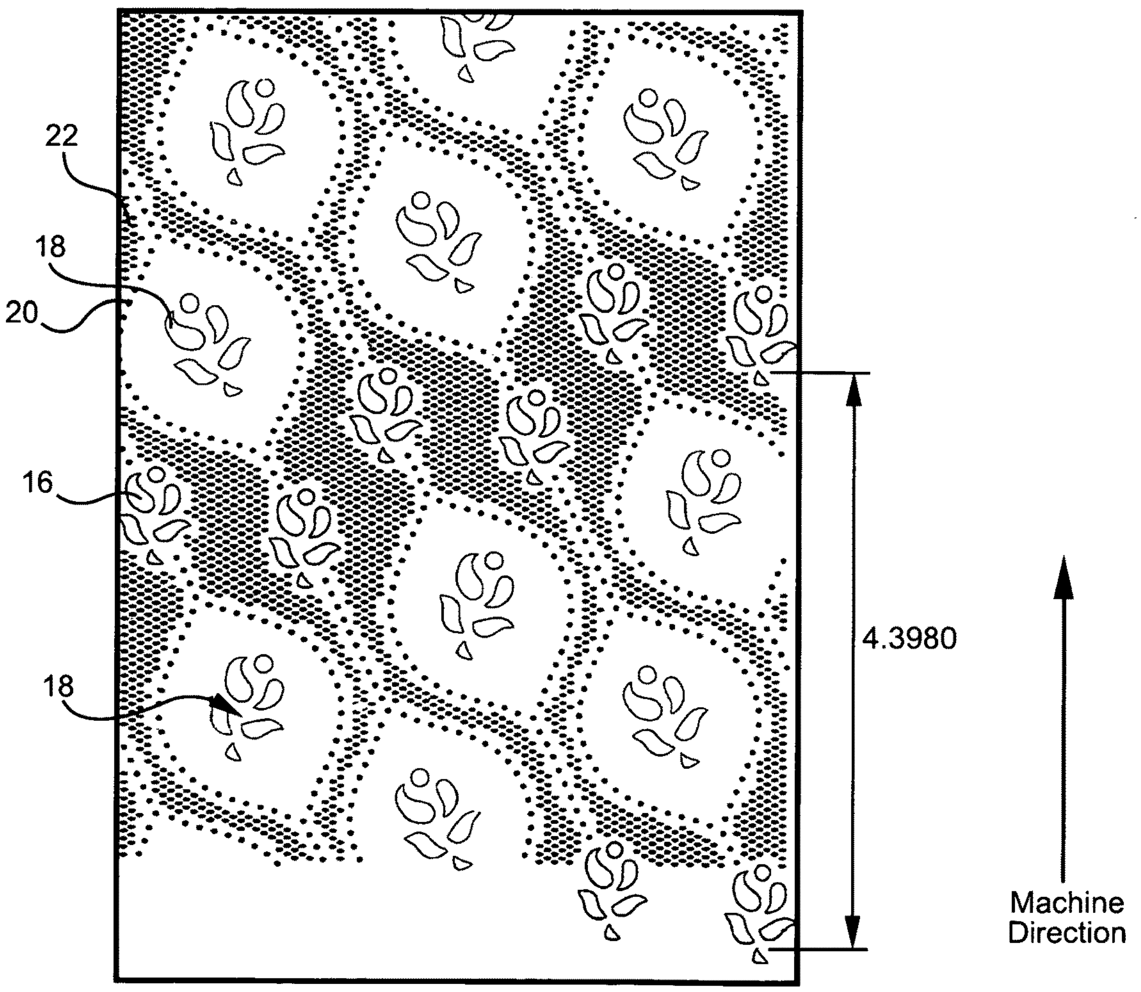
FIGS. 1 and 2 are elevational views of an emboss pattern for a tissue product according to the present invention.
Figure 2:
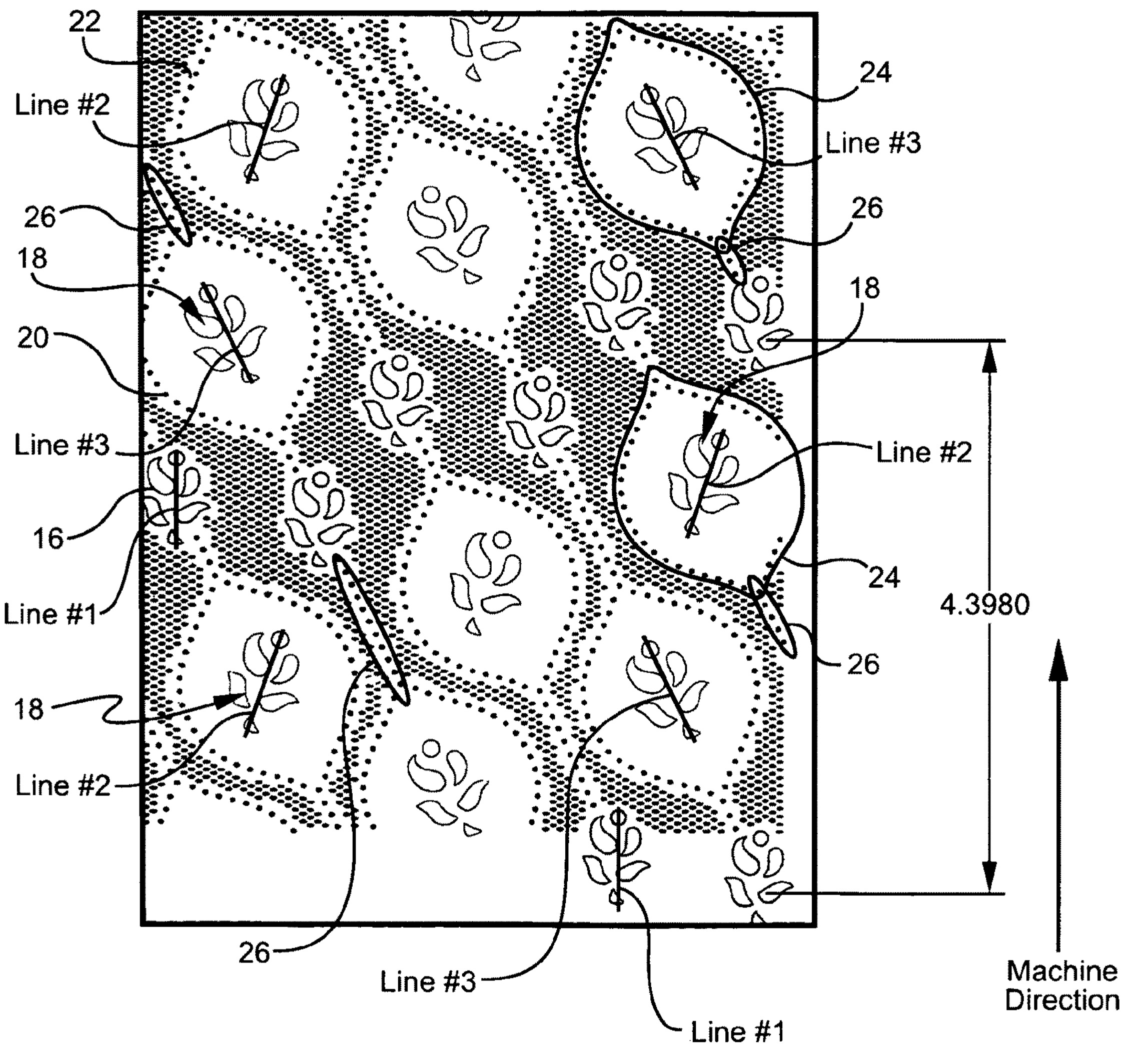

FIGS. 1-9 illustrate an emboss pattern for a tissue product according to the present invention. FIGS. 1 and 2 are elevational views of the overall pattern of the embossed pattern and disclose small and large signature bosses 16, 18, macro bosses 20, and micro bosses 22. The repeat pattern length is 4.4980 inches. In preferred embodiments of the invention, the repeat pattern length is between about 3.5 inches to about 5.5 inches.

Referring to FIG. 2, macro bosses 20 are arranged in a plurality of closed cells 24 and broken linear segments 26. Linear segments 26 associated with adjacent cells 24 are generally parallel to each other and extend across the tissue paper in a predetermined inclined direction relative to the machine direction. Closed cells 24 are generally defined as tapered ellipses. Closed cells 24 are arranged in nested form. In the boss pattern of FIGS. 1-9, micro bosses 22 define a fill pattern external to the closed cells 24 containing large signature bosses 18. Groupings of signature bosses 16, 18 are aligned in different orientations (inclinations) relative to the machine direction. As indicated by Line #1, small signature bosses 16 are aligned with respective major axes being parallel to the machine direction. As indicated by Line #2, some of the large signature bosses 18 are offset in a clockwise direction from the machine direction. As indicated by Line #3, other large signature bosses 18 are offset in a counterclockwise direction relative to machine direction. FIG. 2 also illustrates that the major axes of some of the signature bosses 18 within closed cells 24 are generally aligned in the direction defined by broken linear segments 26, i.e., those signature bosses 18 associated with Line #3. Other signature bosses 8 within closed cells 24 are offset relative to the direction defined by linear segments 26, e.g., the signature bosses 18 associated with Line #2. The angular offset of bosses 18 relative to the machine direction is preferably between about 15 degrees to about 35 degrees.

Figure 3:
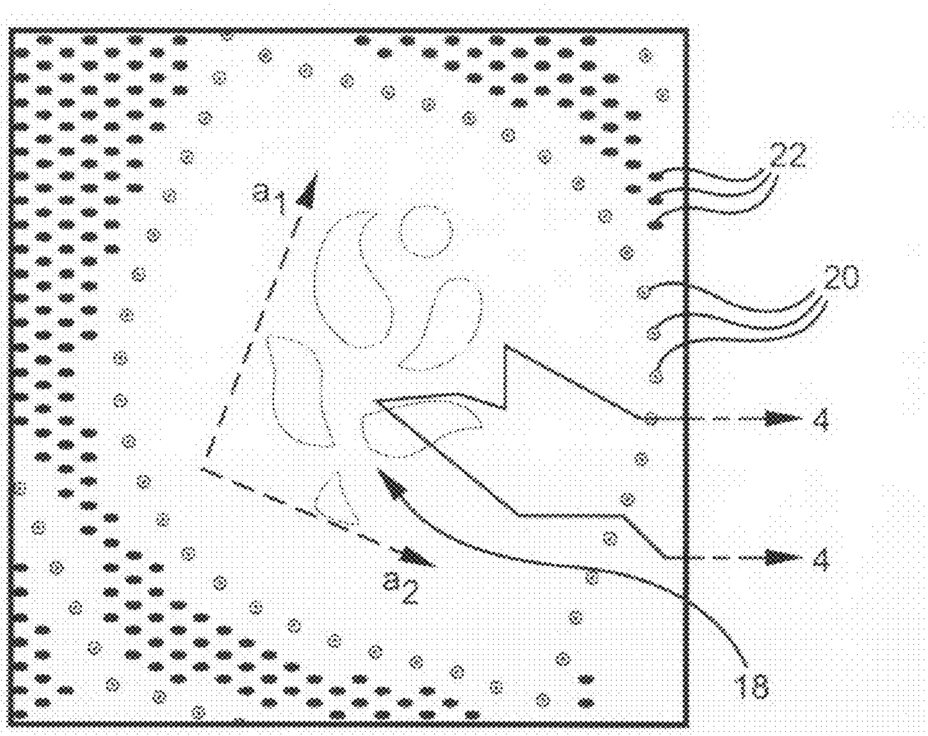
FIG. 3 is an elevational view of a grouping of linear elements defining a signature emboss grouping of the most preferred embodiment of the present invention.

In illustrated embodiments of the present invention, signature bosses 16, 18 define tulip-shaped elements. FIG. 3 is an elevational view of a grouping of linear elements defining a signature boss grouping of the most preferred embodiment of the present invention. Signature bosses 16 have a major axis, $A_1$, a minor axis, $A_2$, and a length along the major axis being greater than a length along the minor axis. In preferred embodiments of the present invention, the major axis length is more than 1.5 times greater than the minor axis length.

Figure 4:
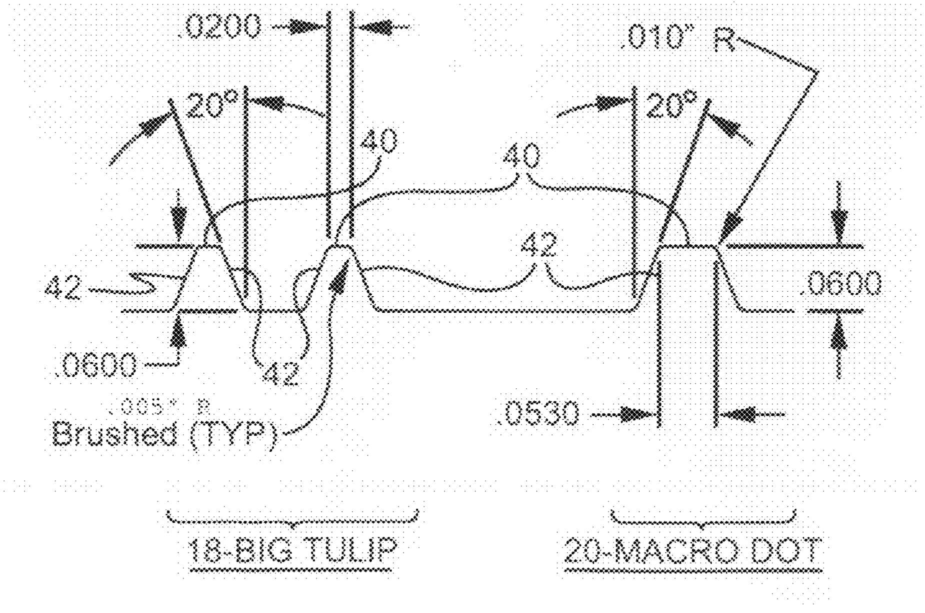
FIG. 4 is a sectional view along line 4-4 in FIG. 3.

FIG. 4 is a sectional view along line 4-4 in FIG. 3 and includes a cross sectional view of signature boss 18 and macro boss 20. Signature boss 18 and macro boss 20 each include a plateau 40 and downwardly extending sidewalls 42. The transition between plateau 40 and sidewalls 42 may have a radius of curvature. Signature boss 18 has a plateau width of 0.0200 inch, a plateau height of 0.0600 inch, downwardly extending side walls 42 defined by acute angles of 20 degrees, and a radius of curvature between plateau 40 and sidewalls 42 of 0.005 inch. Macro boss 20 has a plateau width of 0.0530 inch, a plateau height of 0.0600 inch, downwardly extending side walls 42 defined by acute angles of 20 degrees, and a radius of curvature between plateau 40 and sidewalls 42 of 0.010 inch.

Figure 5:
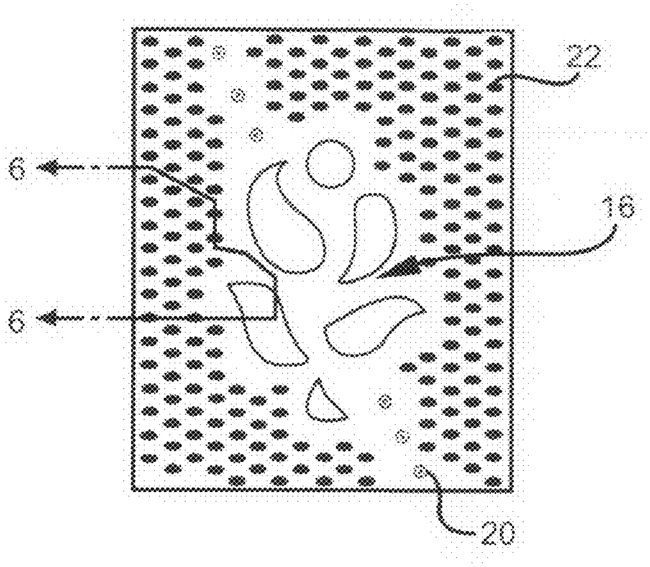
FIG. 5 is an elevational view of a portion of the emboss pattern of FIGS. 1 and 2.

FIG. 5 is a top view of a portion of a grouping of linear elements defining a signature emboss grouping 16 according to an embodiment of the present invention.

Figure 6:
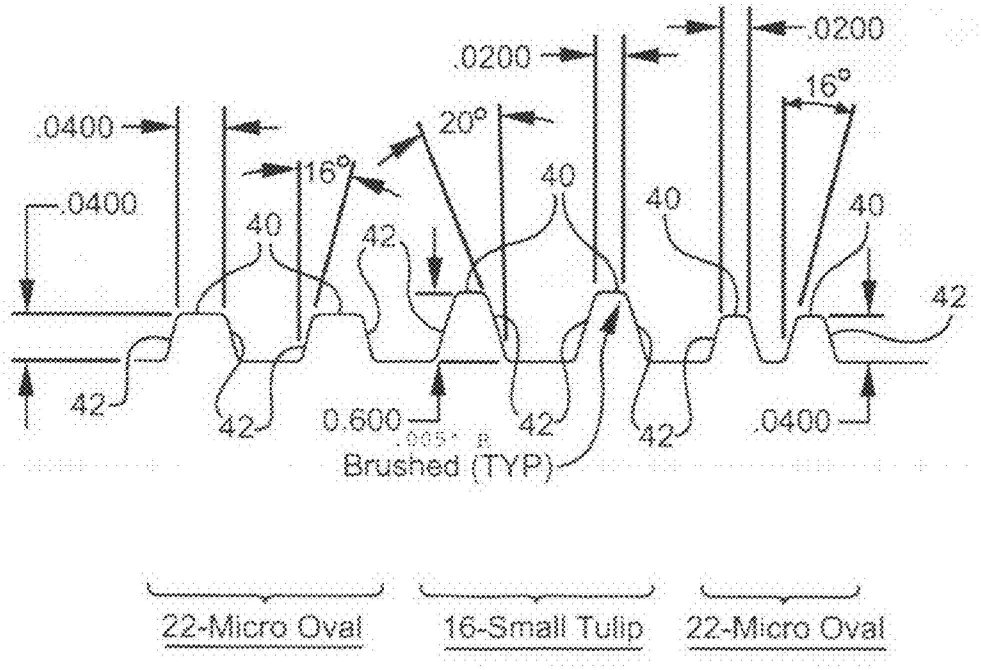
FIG. 6 is a sectional view along line 6-6 in FIG. 5.

FIG. 6 is a view taken along line 6-6 in FIG. 5 and includes a cross sectional view of micro boss 22 and small signature boss 16. Micro boss 22 has a plateau width of 0.0400 inch, a plateau height of 0.0400 inch and downwardly extending side walls 42 defined by acute angles of 16 degrees. Signature boss 16 has a plateau width of 0.0200 inch, a plateau height of 0.0600 inch, downwardly extending side walls 42 defined by acute angles of 20 degrees, and a radius of curvature between plateau 40 and sidewalls 42 of 0.005 inch.

Figure 7:
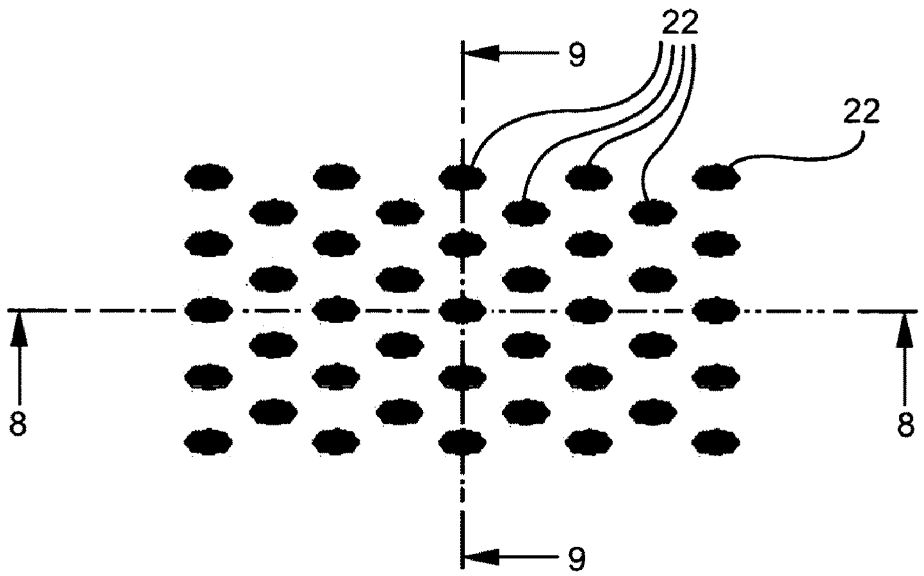
FIG. 7 is an elevational view of a portion of the emboss pattern of FIGS. 1 and 2.
Figure 8:
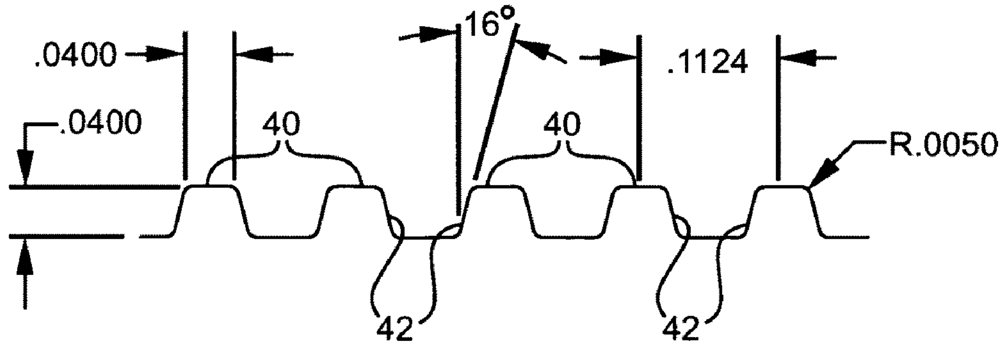
FIG. 8 is a sectional view along line 8-8 of FIG. 7.

FIG. 7 is an elevational view of a grouping of background micro boss elements 22. FIG. 8 is a sectional view along line 8-8 of FIG. 7. Micro boss elements 22 have a plateau width of 0.0400 inch, a plateau height of 0.0400 inch, downwardly extending side walls 42 defined by acute angles of 16 degrees, and a radius of curvature between plateau 40 and sidewalls 42 of 0.0050 inch. The boss elements 22 are spaced 0.1124 inch in the direction defined by section line 9-9.

Figure 9:
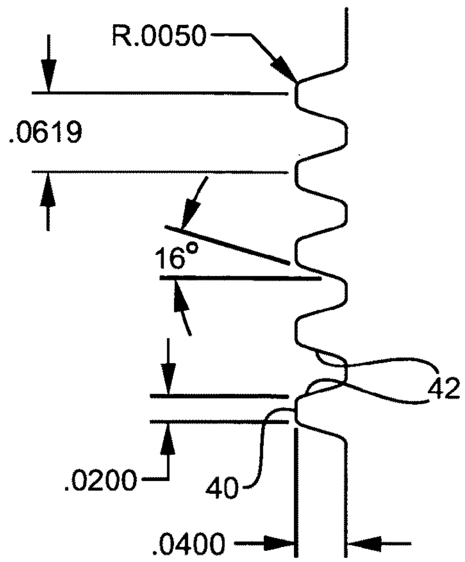
FIG. 9 is a sectional view along line 9-9 of FIG. 7.

FIG. 9 is a sectional view along line 9-9 of FIG. 7. Micro boss elements 22 have a plateau width of 0.0200 inch, a plateau height of 0.0400 inch, downwardly extending side walls 42 defined by acute angles of 16 degrees, and a radius of curvature between plateau 40 and sidewalls 42 of 0.0050 inch. The boss elements 22 are spaced 0.0619 inch in the direction defined by section line 10-10.

Figure 10:
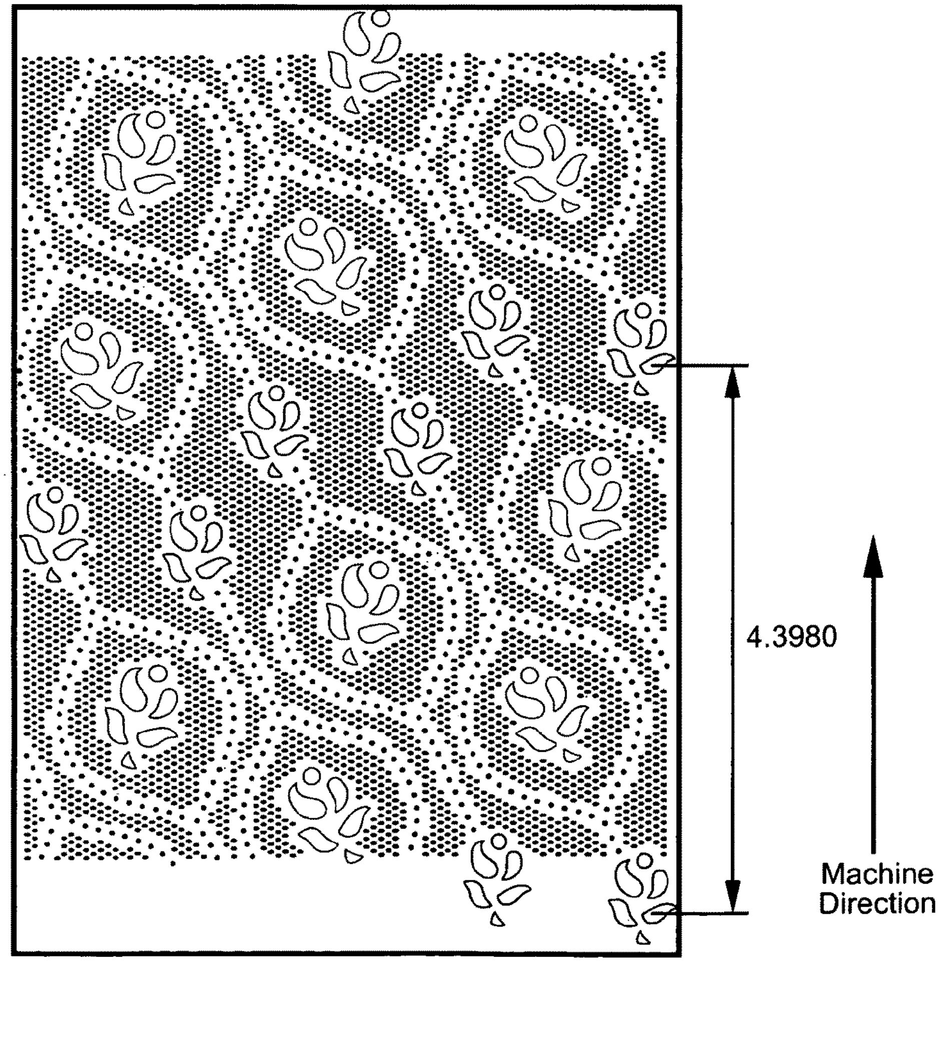
FIGS. 10 and 11 are elevational views of another embodiment of an emboss pattern for a tissue product according to the present invention.
Figure 11:
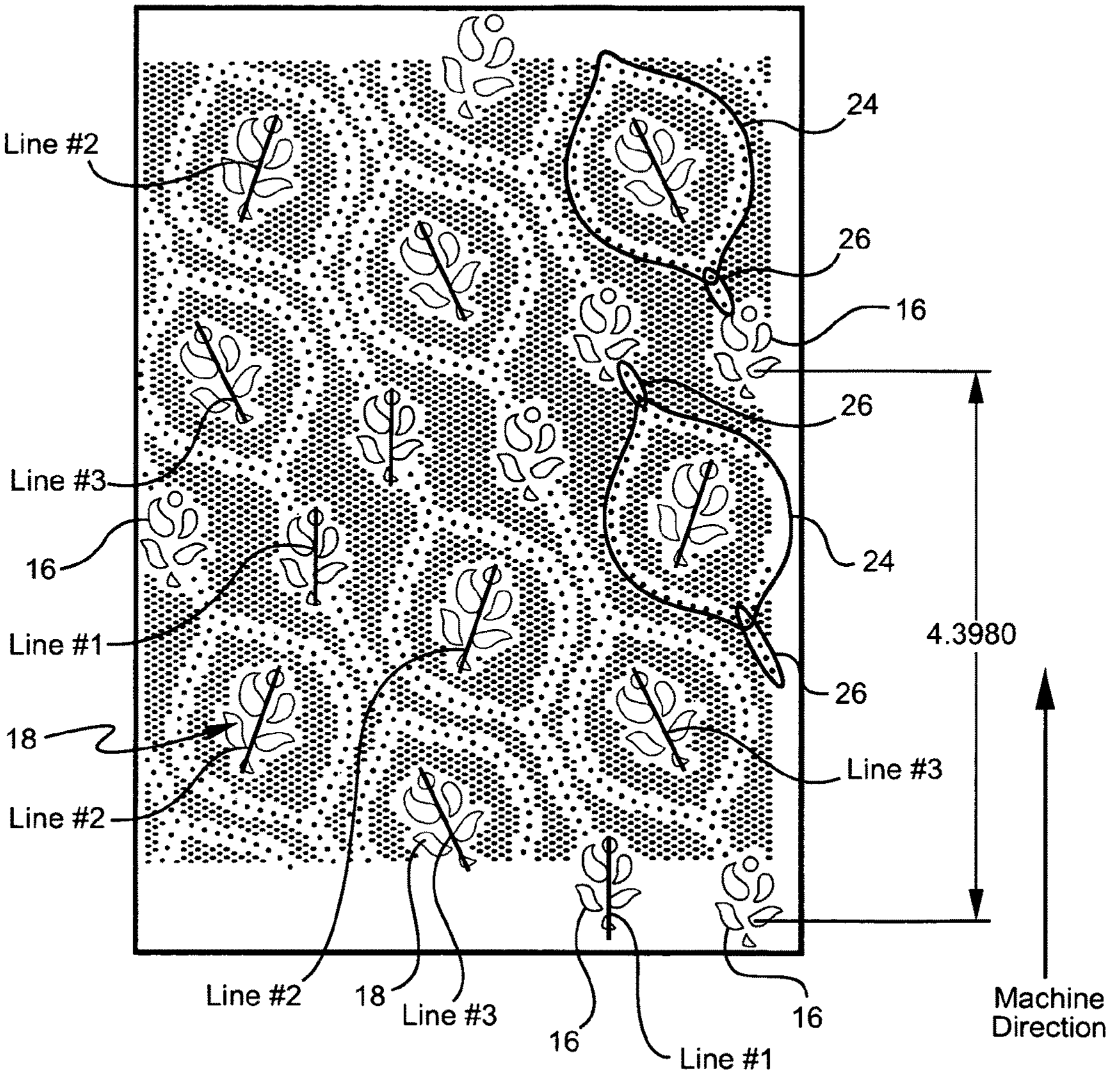

FIGS. 10-18 illustrate another emboss pattern for a tissue product according to the invention. FIGS. 10 and 11 are elevational view of the overall emboss pattern and disclose large and small signature bosses 16, 18, macro bosses 20, and micro bosses 22.

Signature bosses 16, 18 define tulip-shaped elements. Signature bosses 16, 18 have a major axis and a minor axis and a length along the major axis being greater than a length along the minor axis. In preferred embodiments of the present invention, the major axis length is more than 1.5 times greater than the minor axis length.

Macro bosses 20 define a plurality of closed cells 24 and broken linear segments 26. Linear segments 26 associated with adjacent cells 24 are generally parallel to each other and extend across the tissue paper in a predetermined direction offset from the machine direction. Closed cells 24 are generally defined as tapered ellipses. In the embodiments of FIGS. 10-18, micro bosses 22 define a fill pattern external to the closed cells 24 containing large signature bosses 18 and also internal to the closed cells 24.

Referring to FIG. 11, macro bosses 20 define a plurality of closed cells 24 and broken linear segments 26. Linear segments 26 associated with adjacent cells 24 are generally parallel to each other and extend across the tissue paper in a predetermined inclined direction relative to the machine direction. Closed cells 24 are generally defined as tapered ellipses. In the boss pattern embodiments of FIGS. 10-18, micro bosses 22 define a fill pattern external to the closed cells 24 containing large signature bosses 18 and also internal within the closed cells 24. Groupings of signature bosses 16, 18 are aligned in different orientations (inclinations) relative to the machine direction. As indicated by Line #1, small signature bosses 16 are aligned with respective major axes being parallel to the machine direction. As indicated by Line #2, some of the large signature bosses 18 are offset in a clockwise direction from the machine direction. As indicated by Line #3, other large signature bosses 18 are offset in a counterclockwise direction relative to machine direction. FIG. 10, also illustrates that the major axes of some of the signature bosses 18 within closed cells 24 are generally aligned in the direction defined by broken linear segments 26, i.e., those signature bosses 18 associated with Line #3. Other signature bosses 8 within closed cells 24 are offset relative to the direction defined by linear segments 26, e.g., the signature bosses 18 associated with Line #2. The angular offset of bosses 18 relative to the machine direction is preferably between about 15-35 degrees.

Figure 12:
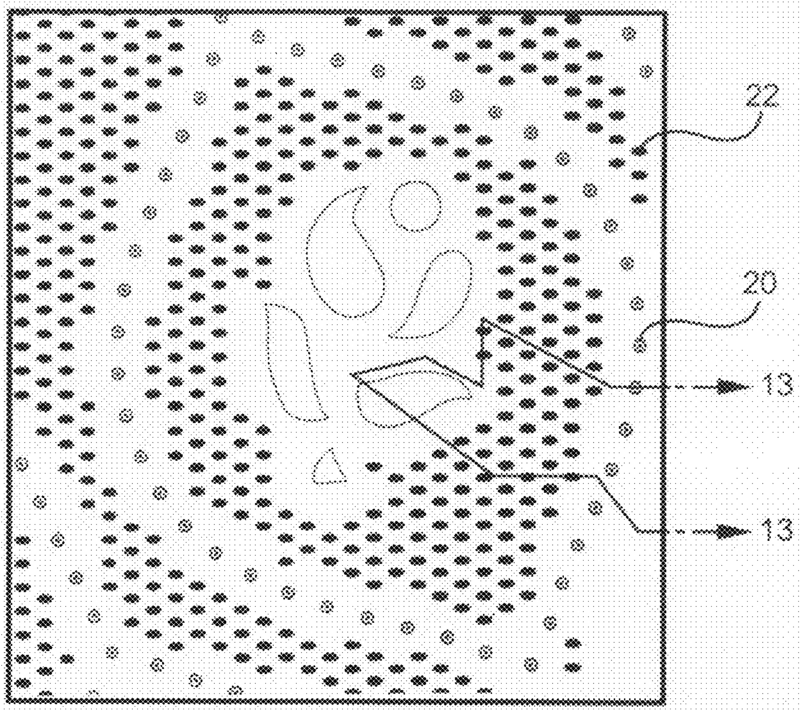
FIG. 12 is an elevational view of a grouping of linear elements defining a signature emboss grouping of the embossed pattern of FIG. 11.
Figure 13:
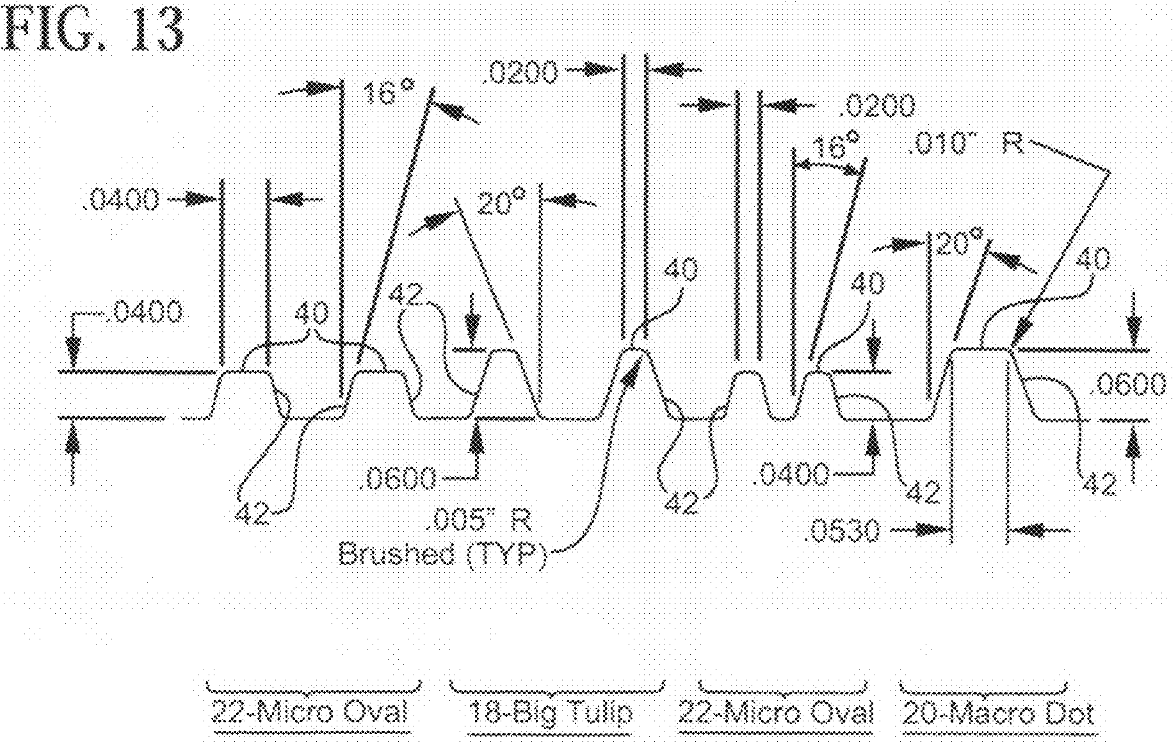
FIG. 13 is a sectional view along line 13-13 in FIG. 12.

FIG. 13 is a view taken along line 13-13 in FIG. 12 and includes a cross sectional view of signature boss 18 and macro boss 20. Signature boss 18 and macro boss 20 each include a plateau 40 and downwardly extending sidewalls 42. The transition between plateau 40 and sidewalls 42 may have a radius of curvature. Signature boss 18 has a plateau width of 0.0200 inch, a plateau height of 0.0600 inch, downwardly extending side walls 42 defined by acute angles of 20 degrees, and a radius of curvature between plateau 40 and sidewalls 42 of 0.005 inch. Macro boss 20 has a plateau width of 0.0530 inch, a plateau height of 0.0600 inch, downwardly extending side walls 42 defined by acute angles of 20 degrees, and a radius of curvature between plateau 40 and sidewalls 42 of 0.010 inch.

Figure 14:
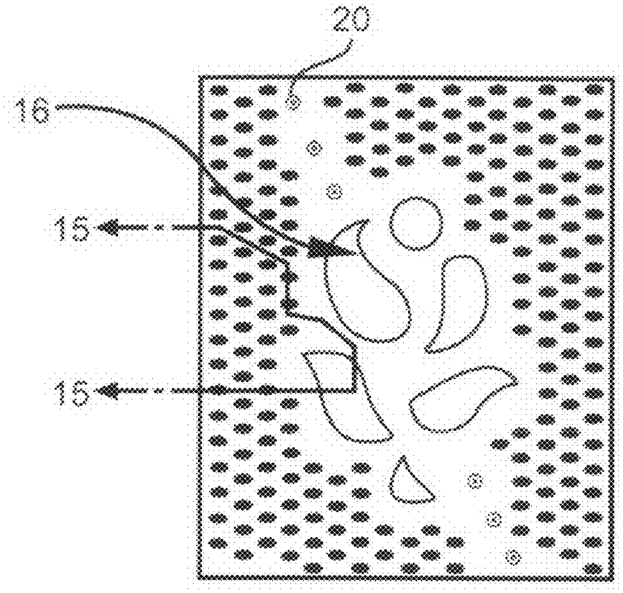
FIG. 14 is an elevational view of a portion of a grouping of linear elements defining a signature emboss grouping of the embossed pattern of FIG. 11.

FIG. 14 is a top view of a portion of a grouping of linear elements defining a signature emboss grouping 16.

Figure 15:
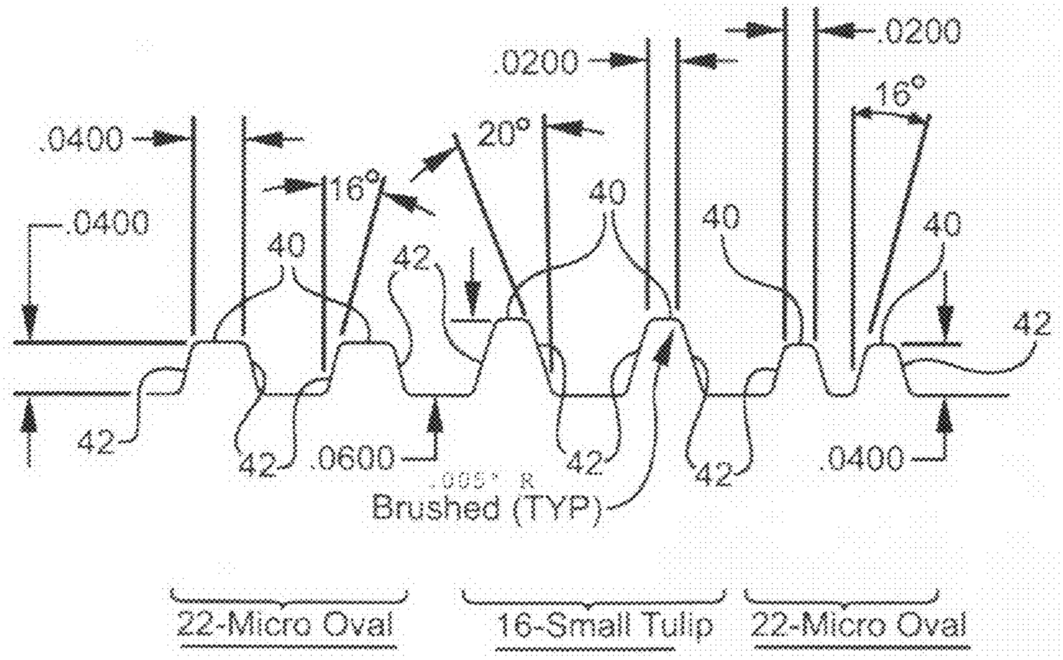
FIG. 15 is a sectional view along line 15-15 in FIG. 14.

FIG. 15 is a sectional view along line 15-15 in FIG. 14 and includes a cross sectional view of micro boss 22 and a small signature boss 16. Micro boss 22 has a plateau width of 0.0400 inch, a plateau height of 0.0400 inch and downwardly extending side walls 42 defined by acute angles of 16 degrees. Signature boss 18 has a plateau width of 0.0200 inch, a plateau height of 0.0600 inch, downwardly extending side walls 42 defined by acute angles of 20 degrees, and a radius of curvature between plateau 40 and sidewalls 42 of 0.005 inch.

Figure 16:
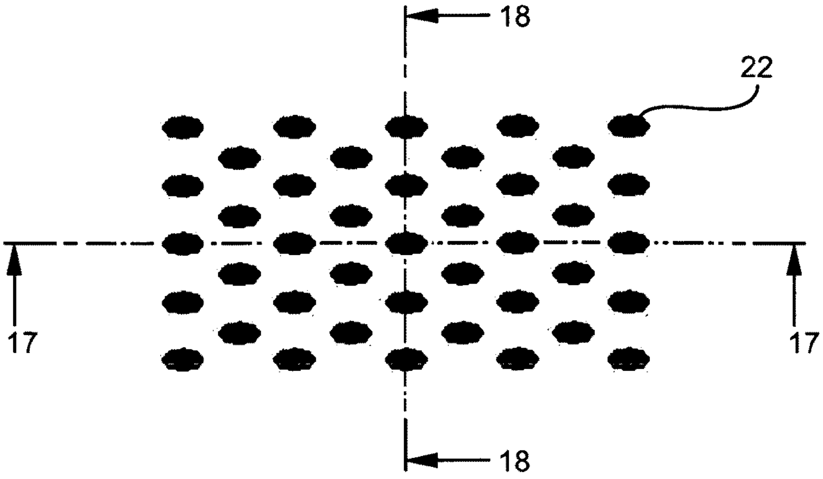
FIG. 16 is an elevational view of a grouping of background micro-emboss elements of the embossed pattern of FIG. 11.
Figure 17:
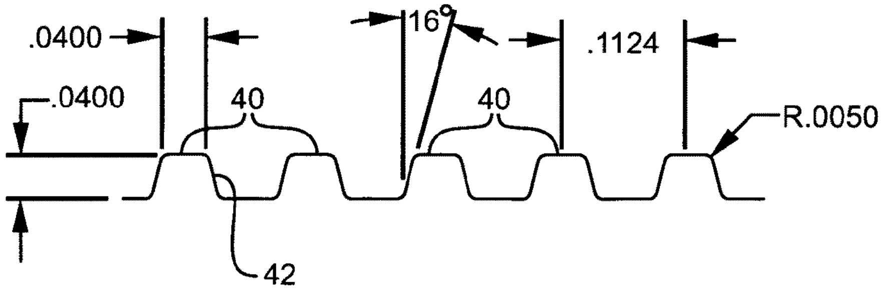
FIG. 17 is a sectional view along line 17-17 of FIG. 16.

FIG. 16 is an elevational view of a grouping of background micro boss elements 22 of a highly preferred embodiment of the present invention. FIG. 17 is a sectional view along line 17-17 of FIG. 16. Micro boss elements 22 have a plateau width of 0.0400 inch, a plateau height of 0.0400 inch, downwardly extending side walls 42 defined by acute angles of 16 degrees, and a radius of curvature between plateau 40 and sidewalls 42 of 0.0050 inch. The boss elements 22 are spaced 0.1124 inch in the direction defined by section line 17-17.

Figure 18:
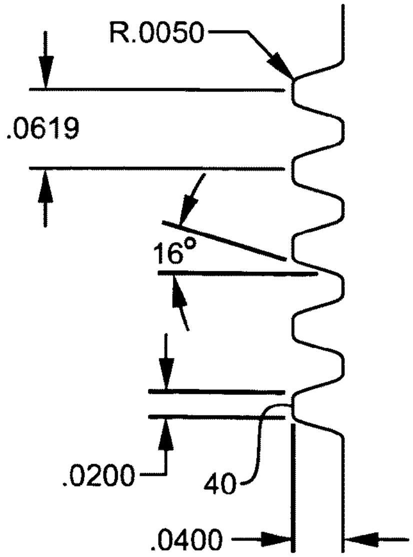
FIG. 18 is a sectional view along line 18-18 of FIG. 17.
Figure 19:
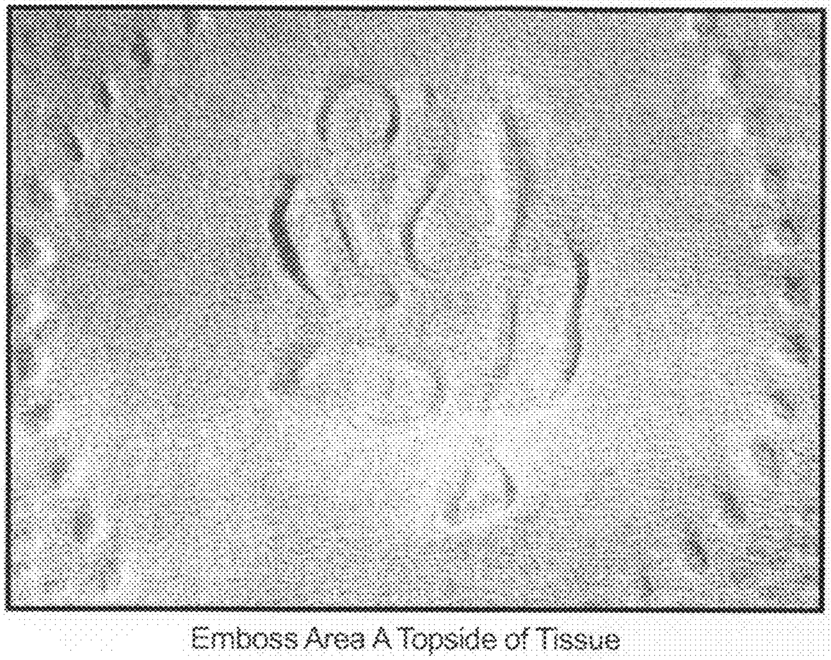
FIGS. 19-22 are low magnification photomicrographs of tissue of the present invention made using the emboss pattern of FIGS. 1-9.
Figure 20:
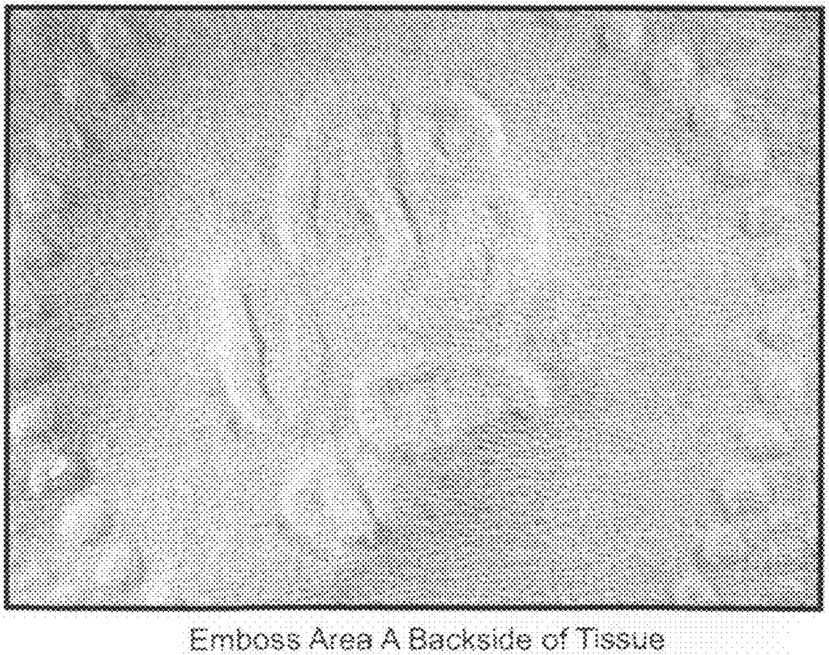
Figure 21:
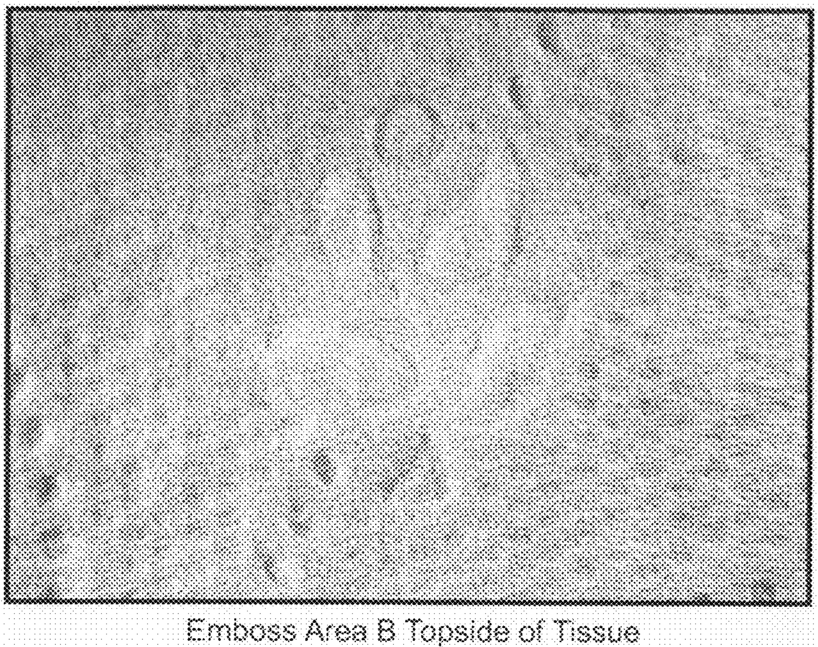
Figure 22:
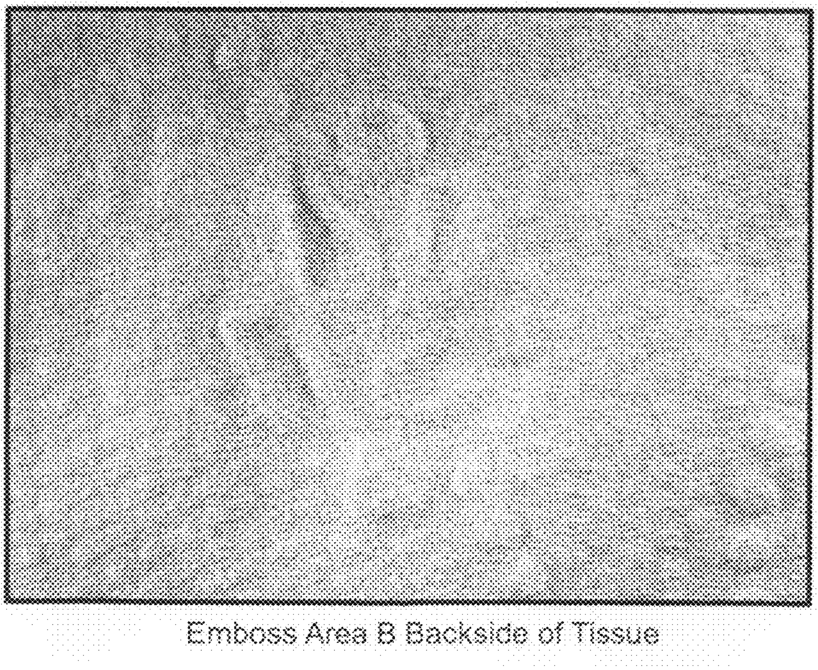

FIG. 18 is a sectional view along line 18-18 of FIG. 17. Micro boss elements 22 have a plateau width of 0.0200 inch, a plateau height of 0.0400 inch, downwardly extending side walls 42 defined by acute angles of 16 degrees, and a radius of curvature between plateau 40 and sidewalls 42 of 0.0050 inch. The boss elements 22 are spaced 0.0619 inch in the direction defined by section line 18-18.

FIGS. 19-22 are low magnification photomicrographs of a tissue product made using the emboss pattern of FIGS. 1-9.

Figure 23:
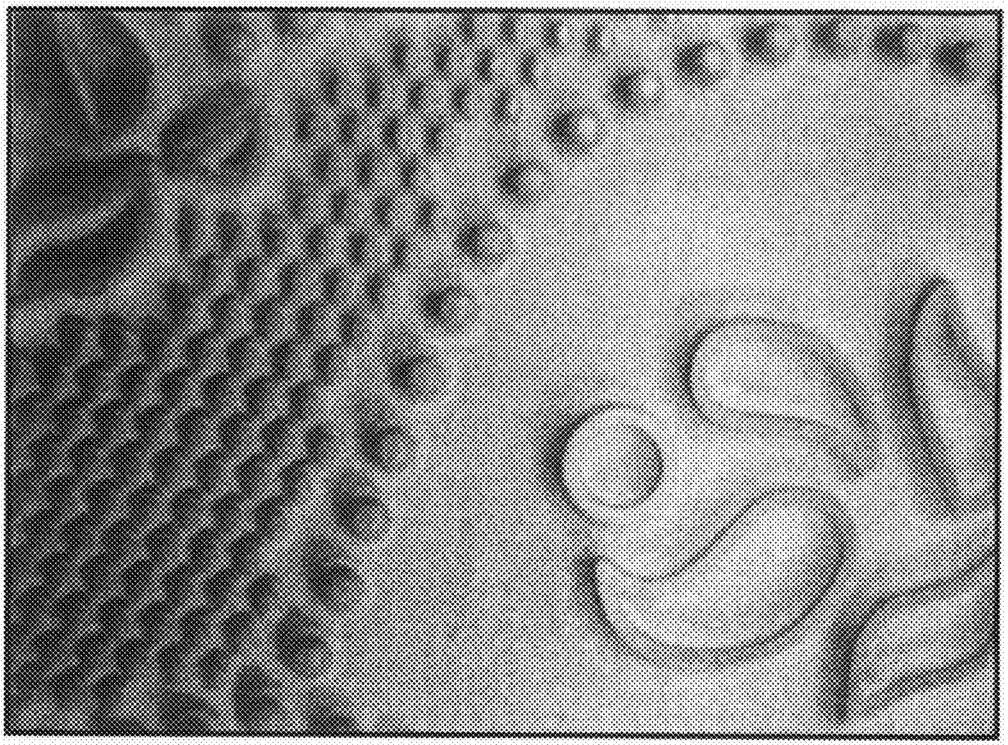
FIG. 23 is a photomicrographs illustrating the detail of the differences in appearance of the three groups of emboss elements in the tissue made according to the most preferred embodiment of the present invention.

FIG. 23 is a photomicrograph illustrating the differences in appearance of the three groups of emboss elements in the tissue made using the emboss pattern of FIGS. 1-9.

Figure 24:
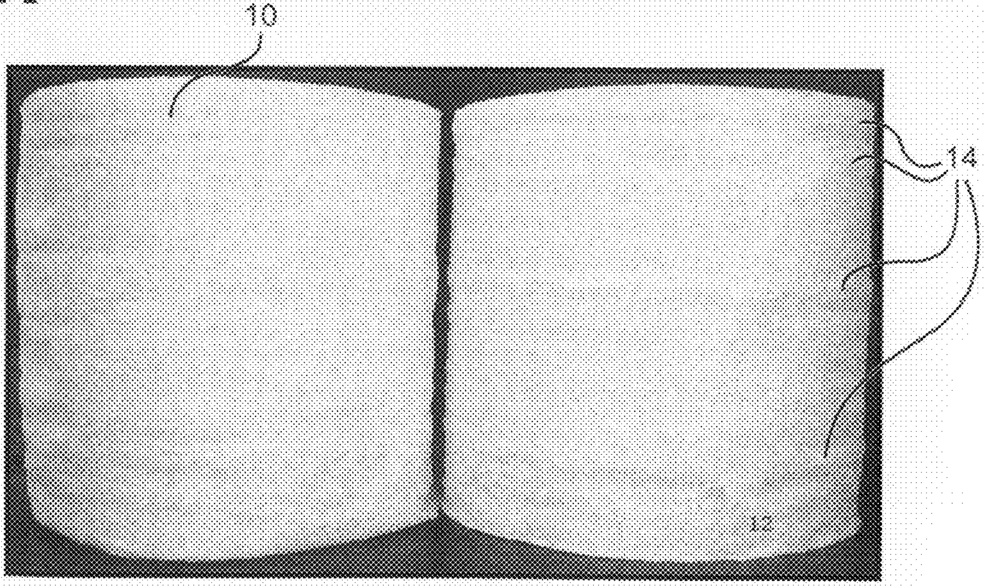
FIG. 24 is a photograph comparing a roll produced according to present invention with mixed inclination signature emboss elements and an otherwise equivalent comparison roll without mixed inclination signature emboss elements.

FIG. 24 is a photograph comparing a roll 10 produced according to present invention with mixed inclination signature emboss elements and an otherwise equivalent comparison roll 12 without mixed inclination signature emboss elements. Ridging of the comparison roll 12 is indicated by reference numeral 14. In comparison, roll 10 is more uniform in shape and is defined by significantly less ridging.

Figure 25:
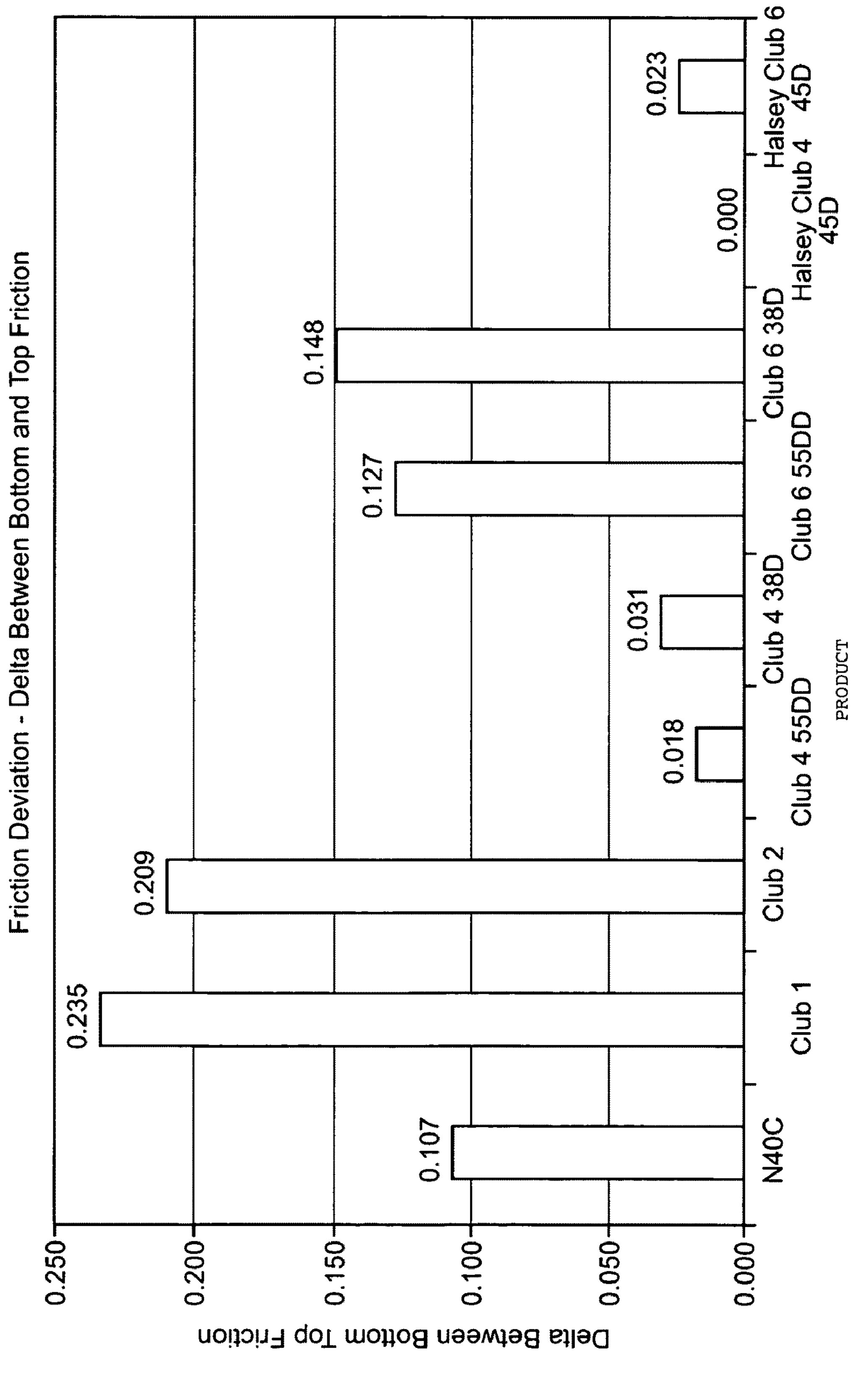
FIG. 25 is a bar graph illustrating friction deviations of tissue products according to present invention as compared to prior art tissue products.

FIG. 25 is a bar graph illustrating friction deviations between the bottom and top surface of tissue products according to present invention as compared to prior art tissue products. The Club 6 products utilized the boss patterns of FIGS. 1-9 and the Club 4 product utilized the boss patterns of FIGS. 10-18. As compared to the prior art products (Club 1, Club 2, N40C), the Club 6 and Club 4 products exhibited significantly lower frictional differences. A tissue product with a lower frictional delta is preferred as such products provide higher perceived softness.

Consumer perception testing was carried out to rate the quality of the product using the emboss patterns of the present invention. In one example, market testing was conducted in which the embossed tissues of the present invention as described in the specification (FIGS. 1-18), was compared to prior art tissue. Three sets of tissue rolls were prepared from substantially identical base sheets using the patterns of FIGS. 1-9, FIGS. 10-18 and U.S. Pat. No. 5,597,639, respectively. When tested in a Home Use Test ("HUT"), the results shown in FIG. 26 were obtained. The HUT included a total of 1,777 test participants. The winning test products were to have a higher overall average rating (OAR) than the control product in order to replace the existing control product bath tissue product. The "Current product 425 ct." refers to sheets using the pattern of U.S. Pat. No. 5,597,639. The "425 ct. Club 6" product refers to sheets using the pattern of FIGS. 1-9, and the "425 ct. Club 5" product refers to sheets using the pattern of FIGS. 10-18. The overall average rating (OAR) of the 425 ct. Club 6 pattern was the highest. Both the Club 4 and Club 6 products yield significant improvements in absorbency, softness, attractiveness and roll life as compared to the control product.

In another test, four sets of tissue rolls were prepared from substantially identical base sheets using the patterns of FIGS. 1-9 and FIGS. 10-18. When evaluated by a sensory panel, the results of FIG. 27 were obtained.

In yet another test, two sets of tissue rolls were prepared, one incorporating the emboss pattern of FIGS. 1-9, the other incorporating a prior art emboss pattern. It was revealed that the tissue rolls corresponding to FIGS. 1-9 exhibited minimal and fully acceptable ridging while the tissue rolls corresponding to prior art emboss patterns exhibited excessive ridging as illustrated in FIG. 24. FIG. 24 is a photograph comparing a roll 10 produced according to present invention with mixed inclination signature emboss elements and an otherwise equivalent comparison roll 12 without mixed inclination signature emboss elements. Ridging of the comparison roll 12 is indicated by reference numeral 14. In comparison, roll 10 is more uniform in shape and is defined by significantly less ridging.

Figure 28:
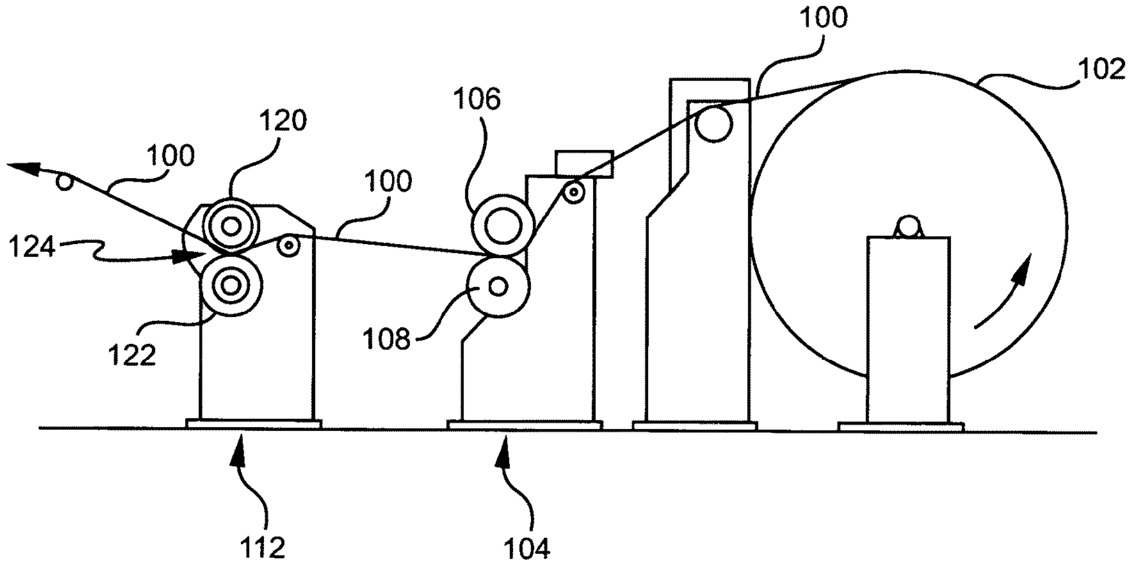
FIG. 28 is a schematic process flow diagram for a method of making an embossed, rolled tissue product in accordance with the present invention.

Aspects of a method for manufacturing a tissue product of the present invention are shown in greater detail in the process flow diagram of FIG. 28. A tissue web 100 as would be produced by a tissue manufacturing machine is unwound from a parent roll 102 in a conventional manner. The unwound tissue web 100 is transported to a calendering unit 104 comprising a pair of calendering rolls 106 and 108. Upon exiting calendering unit 104, the tissue web 100 is transported to an embossing unit 112. Embossing unit 112 comprises a pattern roll 120 and a backing roll 122 that together define an embossing nip 124. Embossing nip 124 may comprise a "soft-nip" wherein the rolls have different surface hardnesses and at least one of the rolls has a resilient surface. A resilient backing roll 122 suitable for the present invention can be a rubber covered embossing roll, although the actual material may comprise natural rubber, synthetic rubber, composites, or other compressible surfaces. Suitable resilient backing rolls 122 may have a surface hardness from about 70 to 190 Pusey & Jones, and particularly from about 120 to 160 Pusey & Jones. For example, pattern roll 120 may comprise a smooth steel roll and backing roll 122 may be formed of a composite polymer such as that available from Valley Roller, Inc., under the tradename "Cool Nip Plus." The embossing nip 124 pressure is suitably from about 100 to about 325 pounds per lineal inch, and more particularly from about 150 to about 275 pounds per lineal inch, such that the embossing pattern is imparted to the tissue web 100. The static coefficient of friction for backing roll 122 is from about 1.5 to 3.0, and particularly from about 2.0 to 2.5. The calendered and embossed tissue web 100 is subsequently wound onto tissue roll cores to form logs at a rewinding unit. The logs are cut into appropriate widths and the resulting individual tissue rolls are packaged (not shown).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A nonwoven fibrous web having a machine direction and a cross direction, with the machine direction extending substantially parallel to a free edge of the web, and having a plurality of bosses formed therein comprising:

- a plurality of signature boss groupings, each grouping including a plurality of similarly aligned signature bosses, each said signature boss having a major axis, wherein major axes of one of said groupings diverging in the clockwise direction from the machine direction of said web by from about 5° to 45°, and the major axes of another of said groupings diverging in the counter-clockwise direction from the machine direction of said web by from about 5° to 45°, wherein a plurality of bosses form groupings of nested cells;
- a plurality of micro bosses, wherein said nested cells are separated by at least a portion of said plurality of micro bosses, said micro bosses being generally elliptical in form.

2. The nonwoven fibrous web of claim 1 wherein said micro bosses have an aspect ratio of between about 1 to 1.5.

3. A nonwoven fibrous web having a machine direction and a cross direction, with the machine direction extending substantially parallel to a free edge of the web, and having a plurality of bosses formed therein comprising:

a plurality of signature boss groupings, each grouping including a plurality of similarly aligned signature bosses, each said signature boss having a major axis, wherein major axes of one of said groupings diverging in the clockwise direction from the machine direction of said web by from about 5° to 45°, and the major axes of another of said groupings diverging in the counter-clockwise direction from the machine direction of said web by from about 5° to 45°, wherein a plurality of bosses form groupings of nested cells;

a plurality of micro bosses, wherein said nested cells are separated by at least a portion of said plurality of micro bosses, wherein said nested cells also contain micro bosses.

4. The nonwoven fibrous web of claim 3 wherein said micro bosses within the nested cells are identical to said micro bosses separating said nested cells.

5. The nonwoven fibrous web of claim 4 wherein each nested cell is substantially surrounded by a plurality of micro bosses.

6. A nonwoven fibrous web having a machine direction and a cross direction, with the machine direction extending substantially parallel to a free edge of the web, and having a plurality of bosses formed therein comprising:

a plurality of signature boss groupings, each grouping including a plurality of similarly aligned signature bosses, each said signature boss having a major axis, wherein major axes of one of said groupings diverging in the clockwise direction from the machine direction of said web by from about 5° to 45°, and the major axes of another of said groupings diverging in the counter-clockwise direction from the machine direction of said web by from about 5° to 45°, wherein a plurality of bosses form groupings of nested cells;

a plurality of micro bosses, wherein said nested cells are separated by at least a portion of said plurality of micro bosses, wherein said nested cells are tapered ellipses.

7. A sheet of tissue having a plurality of bosses defined therein comprising:

a plurality of signature boss groupings, each grouping including a plurality of similarly aligned signature bosses, wherein major axes of one of said groupings extend in a machine direction, major axes of another of said groupings diverging in the clockwise direction from the machine direction by from about 5° to 45°, the major axes of another of said groupings diverge in the counter-clockwise direction from the machine direction of said web by from about 5° to 45°, wherein a plurality of bosses form groupings of nested cells;

a plurality of micro bosses, said nested cells being separated by at least a portion of said plurality of micro bosses, wherein said micro bosses are generally elliptical in form.

8. A sheet of tissue having a plurality of bosses defined therein comprising:

a plurality of signature boss groupings, each grouping including a plurality of similarly aligned signature bosses, wherein major axes of one of said groupings extend in a machine direction, major axes of another of said groupings diverging in the clockwise direction from the machine direction by from about 5° to 45°, the major axes of another of said groupings diverge in the counter-clockwise direction from the machine direction of said web by from about 5° to 45°, wherein a plurality of said bosses form groupings of nested cells:

a plurality of micro bosses, said nested cells being separated by at least a portion of said plurality of micro bosses, each nested cell being substantially surrounded by a plurality of micro bosses.

9. A sheet of tissue having a plurality of bosses defined therein comprising:

a plurality of signature boss groupings, each grouping including a plurality of similarly aligned signature bosses, wherein major axes of one of said groupings extend in a machine direction, major axes of another of said groupings diverging in the clockwise direction from the machine direction by from about 5° to 45°, the major axes of another of said groupings diverge in the counter-clockwise direction from the machine direction of said web by from about 5° to 45°, wherein a plurality of said bosses form groupings of nested cells;

a plurality of micro bosses, said nested cells being separated by at least a portion of said plurality of micro bosses, said nested cells are tapered ellipses.

* * * * *